US012177798B2

(12) United States Patent
Keshavamurthy et al.

(10) Patent No.: US 12,177,798 B2
(45) Date of Patent: Dec. 24, 2024

(54) SIDELINK GROUP COORDINATION FOR GROUP-SPECIFIC SYNCHRONIZATION REFERENCE

(71) Applicant: NOKIA TECHNOLOGIES OY, Espoo (FI)

(72) Inventors: Prajwal Keshavamurthy, Munich (DE); Vinh Van Phan, Oulu (FI); Ling Yu, Kauniainen (FI); Nuno Pratas, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 435 days.

(21) Appl. No.: 17/497,884

(22) Filed: Oct. 8, 2021

(65) Prior Publication Data
US 2023/0115882 A1 Apr. 13, 2023

(51) Int. Cl.
*H04W 56/00* (2009.01)
*H04L 5/00* (2006.01)
*H04W 72/25* (2023.01)

(52) U.S. Cl.
CPC ......... *H04W 56/001* (2013.01); *H04L 5/0048* (2013.01); *H04W 56/0015* (2013.01); *H04W 72/25* (2023.01)

(58) Field of Classification Search
CPC ..... H04W 76/28; H04W 72/25; H04W 72/20; H04W 56/001–0025
See application file for complete search history.

(56) References Cited

U.S. PATENT DOCUMENTS

| | | | | |
|---|---|---|---|---|
| 10,624,049 | B2 * | 4/2020 | Thangarasa | H04W 56/001 |
| 10,785,735 | B2 * | 9/2020 | Chervyakov | H04W 4/40 |
| 11,115,947 | B2 * | 9/2021 | Chervyakov | H04W 56/0015 |
| 11,375,464 | B2 * | 6/2022 | Gulati | H04W 56/0015 |

(Continued)

FOREIGN PATENT DOCUMENTS

EP 4152838 A1 * 3/2023 ........ H04W 52/0229

OTHER PUBLICATIONS

S. Seong, I. Sohn, S. Choi and K. B. Lee, "Distributed synchronization algorithm for infrastructure-less public safety networks," in Journal of Communications and Networks, vol. 20, No. 3, pp. 316-324, Jun. 2018.*

*Primary Examiner* — Brendan Y Higa
(74) *Attorney, Agent, or Firm* — SQUIRE PATTON BOGGS (US) LLP

(57) ABSTRACT

Systems, methods, apparatuses, and computer program products for sidelink group coordination for group-specific synchronization reference are provided. For example, a method can include determining, by a user equipment, whether a first condition is met for coordination on group synchronization reference for a group of user equipment. The method can also include determining, by the user equipment, whether a second condition is met to act as group synchronization reference user equipment for the group. The method can further include transmitting, by the user equipment, a group synchronization reference signal when determined to act as the group synchronization reference user equipment. The method can additionally include performing, by the user equipment, a reduced synchronization search when determined not to act as the group synchronization reference user equipment.

19 Claims, 7 Drawing Sheets

(56) References Cited

U.S. PATENT DOCUMENTS

| | | | |
|---|---|---|---|
| 11,910,341 B2* | 2/2024 | Hu | H04W 56/002 |
| 2017/0142703 A1* | 5/2017 | Xue | H04W 8/005 |
| 2018/0199388 A1* | 7/2018 | Tabet | H04W 76/14 |
| 2018/0352404 A1* | 12/2018 | Yi | H04W 48/16 |
| 2019/0020431 A1* | 1/2019 | Chae | H04W 56/0005 |
| 2020/0053683 A1* | 2/2020 | Gulati | G01S 19/04 |
| 2020/0383055 A1* | 12/2020 | Cai | H04W 72/02 |
| 2021/0227480 A1* | 7/2021 | Sridharan | H04W 76/14 |
| 2022/0039035 A1* | 2/2022 | Chen | H04L 5/0048 |
| 2022/0191795 A1* | 6/2022 | Pan | H04W 52/0232 |
| 2022/0417905 A1* | 12/2022 | Wang | H04W 72/30 |
| 2023/0130337 A1* | 4/2023 | Huang | H04B 17/26 |
| | | | 370/252 |
| 2023/0292266 A1* | 9/2023 | Yang | H04W 56/0015 |
| | | | 370/503 |
| 2023/0319748 A1* | 10/2023 | Castañeda Garcia | |
| | | | H04W 56/0045 |
| | | | 370/503 |
| 2023/0362851 A1* | 11/2023 | Yang | H04W 76/28 |

* cited by examiner

410

Construct a set $S_{trans}$ with SRC IDs of all the UEs that have performed SL transmission during DRX ON time of $(n+l-1)^{th}$ DRX cycle

420

Construct a set $S_{count}$ (subset of $S_{trans}$) with those SRC IDs in $S_{trans}$ which have been determined to have been Group SyncRef UEs least no. of times until $(n+l-1)^{th}$ DRX cycle (cf. Table 2)
$$S_{count} = \{SRC\_ID \in S_{trans} : X_{SRC\_ID} = \min_{ID \in S_{trans}} X_{ID}\}$$

430

UE with the largest SRC_ID in $S_{count}$ is determined as the Group SyncRef UEs for $(n+l)^{th}$ DRX cycle

FIG. 4

SIDELINK GROUP COORDINATION FOR GROUP-SPECIFIC SYNCHRONIZATION REFERENCE

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for providing sidelink group coordination for group-specific synchronization reference.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus. The apparatus can include at least one processor and at least one memory comprising computer program code. The at least one memory and computer program code can be configured, with the at least one processor, to cause the apparatus at least to perform determining whether a first condition is met for coordination on group synchronization reference for a group of user equipment. The at least one memory and computer program code can also be configured, with the at least one processor, to cause the apparatus at least to perform determining whether a second condition is met to act as group synchronization reference user equipment for the group. The at least one memory and computer program code can further be configured, with the at least one processor, to cause the apparatus at least to perform transmitting a group synchronization reference signal when determined to act as the group synchronization reference user equipment. The at least one memory and computer program code can additionally be configured, with the at least one processor, to cause the apparatus at least to perform a reduced synchronization search when determined not to act as the group synchronization reference user equipment.

An embodiment may be directed to a method. The method can include determining, by a user equipment, whether a first condition is met for coordination on group synchronization reference for a group of user equipment. The method can also include determining, by the user equipment, whether a second condition is met to act as group synchronization reference user equipment for the group. The method can further include transmitting, by the user equipment, a group synchronization reference signal when determined to act as the group synchronization reference user equipment. The method can additionally include performing, by the user equipment, a reduced synchronization search when determined not to act as the group synchronization reference user equipment.

An embodiment may be directed to an apparatus. The apparatus can include means for determining whether a first condition is met for coordination on group synchronization reference for a group of user equipment. The apparatus can also include means for determining whether a second condition is met to act as group synchronization reference user equipment for the group. The apparatus can further include means for transmitting a group synchronization reference signal when determined to act as the group synchronization reference user equipment. The apparatus can additionally include means for performing a reduced synchronization search when determined not to act as the group synchronization reference user equipment.

BRIEF DESCRIPTION OF THE DRAWINGS

For proper understanding of example embodiments, reference should be made to the accompanying drawings, wherein:

FIG. 4 illustrates an example of group synchronization reference user equipment determination, according to certain embodiments;

DETAILED DESCRIPTION

Figure 1:
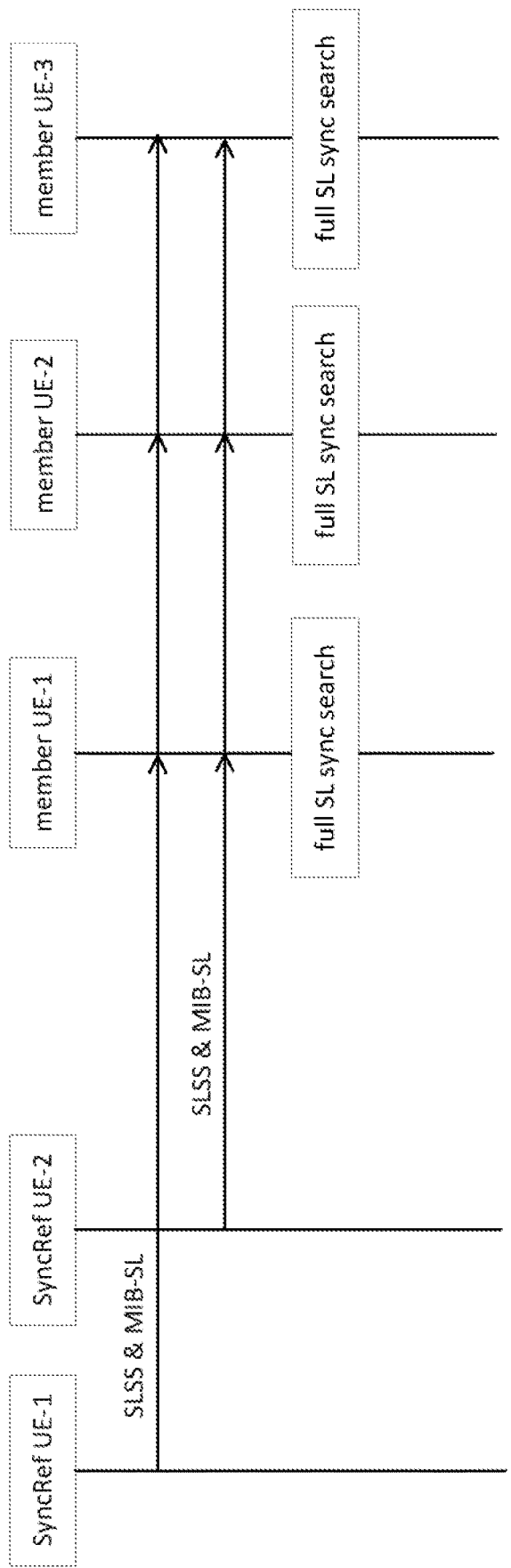
FIG. 1 illustrates a full sidelink synchronization reference search.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing sidelink group coordination for group-specific synchronization reference, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments can provide enhancements related to sidelink (SL) synchronization (sync), which may provide advantages to new radio (NR) SL release 17 (Rel-17) and beyond for power saving at discontinuous reception (DRX)-enabled user equipment (UEs) within a SL DRX UE group, for example.

Power saving can help to increase applicability of SL communication to power-constrained devices such as vulnerable road users (VRU), as well as in wider use cases such as public safety, entertainment, and other commercial applications.

Power saving may enable UEs with battery constraints to perform sidelink operations in a power efficient manner. Rel-16 NR sidelink was designed based on the assumption of an always-on condition when the UE operates sidelink. For example, the expectation was that sidelink might be used in UEs installed in vehicles with sufficient battery capacity.

Certain embodiments may provide power saving for vulnerable road users in vehicle to anything (V2X) use cases and/or for UEs in public safety and commercial use cases, where power consumption in the UEs may need to be minimized.

DRX for SL operation can be considered at UEs to meet the power saving goals. By defining DRX cycles with DRX ON and DRX OFF periods, UEs may turn off their radio components during DRX OFF period to save power. There may be an SL DRX configuration that includes a long SL DRX cycle and an ON duration in a SL DRX cycle. In the following discussion, a UE that is performing DRX operation in SL as per a SL DRX configuration can be referred to as a SL DRX UE.

In NR SL, UEs can be a member of group and perform groupcast SL communication to other members of the group. Within a group, SL DRX UEs may also have a common group-specific DRX configuration to align their DRX ON periods for SL group communication.

SL synchronization can be performed in a variety of ways and with a number of features and characteristics. For example, SL transmissions can be organized in frames identified by a direct frame number (DFN). The DFN may permit a UE to synchronize the UE's own radio frame transmissions according to the SL timing reference. UEs can perform SL synchronization to have the same SL timing reference for SL communication among nearby UEs by synchronizing with a reference. There may be at least four sources for synchronization reference (SyncRef): global navigation satellite system (GNSS), NR Cell (gNB), EUTRAN Cell (eNB), SyncRef UE, or the UE's own internal clock. Here, the SyncRef UE can be a UE acting as SyncRef source that either extends the sync coverage of a SyncRef source (e.g., GNSS, gNB/eNB or another SyncRef UE) or uses the SyncRef UE's own internal clock as the SyncRef.

Sidelink synchronization signal block (S-SSB) transmission by SyncRef UE can be performed. For example, a SyncRef UE can transmit SL sync information in S-SSB to provide SyncRef. This information carried in S-SSB can include SL primary synchronization signal (S-PSS), SL secondary synchronization signal (S-SSS) and physical sidelink broadcast channel (PSBCH). S-PSS and S-SSS can be jointly referred to as the sidelink synchronization signal (SLSS) and can be used for time and frequency synchronization. The S-PSS and S-SSS can be selected out of the candidate sequences based on an SLSS ID, which can represent an identifier of the SyncRef UE and can convey a priority of the SyncRef UE. PSBCH can carry master information block-SL (MIB-SL) which may include DFN, slot index and one-bit indicator whether the SyncRef UE is in coverage of a network or of GNSS.

MasterInformationBlockSidelink can serve as an information element and can have various fields, including directFrameNumber, inCoverage, slotIndex, and SI-TDD-Config. The field directFrameNumber can indicate the frame number in which S-SSB is transmitted. The field inCoverage can be a flag whose true value can indicate that the UE transmitting the MasterInformationBlockSidelink information element is in network coverage or that the UE selects GNSS timing as the synchronization reference source.

The S-SSBs can be transmitted by SyncRef UEs with a fixed periodicity of 160 ms, which can correspond to 16 radio frames. Within each S-SSB period, multiple S-SSBs can be transmitted, and the number of S-SSBs transmitted can be (pre-) configured depending on the subcarrier spacing (SCS) and the frequency range. The UE can select the slot in which to transmit S-SSB according to the S-SSB time allocation (sl-SSB-TimeAllocation1 or sl-SSB-TimeAllocation2) that provides time-offset (sl-TimeOffsetSSB) from the start of the SL SSB period to the first S-SSB, slot interval (sl-TimeInterval) between two neighboring S-SSBs if there are two or more S-SSBs within one S-SSB period, and a number of S-SSB transmissions (SI-NumSSB-WithinPeriod) within one S-SSB period.

SL-SyncConfig can serve as an information element and can have various fields, including sl-NumSSB-WithinPeriod, sl-TimeOffsetSSB, and sl-TimeInterval. The field sl-NumSSB-WithinPeriod can indicate the number of sidelink SSB transmissions within one sidelink SSB period. Applicable values can depend on the subcarrier spacing, for example, for frequency range 1 (FR1) and subcarrier spacing of 15 kHz, a value of 1 may be applicable, while for frequency range 2 (FR2) and subcarrier spacing of 120 kHz, applicable values may include 1, 2, 4, 8, 16, 32, and 64.

The field sl-TimeOffsetSB can indicate the slot offset from the start of a sidelink SSB period to the first sidelink SSB. The field sl-TimeInterval can indicate the slot interval between neighboring sidelink SSBs. This value may be applicable when there are more two or more sidelink SSBs within one sidelink SSB period.

Selection and reselection of a synchronization reference at a UE can have various considerations. For example, a UE can select the UE's SyncRef based on the different priorities of the sources as summarized in Table 1, where P0 to P6 can correspond to highest to lowest priorities, respectively. The selection can depend on whether the synchronization is a GNSS-based synchronization (in which case GNSS may be the highest priority) or gNB/eNB-based synchronization (in which case gNB/eNB may be the highest priority).

TABLE 1

Priority groups of synchronization reference sources

| Priority Group | GNSS-based synchronization | gNB/eNB-based synchronization |
|---|---|---|
| P0 | GNSS | gNB/eNB |
| P1 | UE directly synchronized to GNSS (SyncRef UE in network coverage and directly synchronized to GNSS, i.e., with in Coverage = 1 and SLSS ID = {0}) | UE directly synchronized to gNB/eNB (SyncRef UE directly synchronized to gNB/eNB, i.e., with in Coverage = 1 and with SLSS ID = {1, . . . , 335}) |
| P2 | UE indirectly synchronized to GNSS (SyncRef UE out of GNSS/network coverage and one hop away from GNSS, i.e., with in Coverage = 0 and SLSS ID = {0}) | UE indirectly synchronized to gNB/eNB (SyncRef UE out of GNSS/network coverage and one hop away from a gNB/eNB, i.e., with in Coverage = 0 and with SLSS ID = {1, . . . , 335}) |
| P3 | gNB/eNB | GNSS |
| P4 | UE directly synchronized to gNB/eNB (SyncRef UE directly synchronized to a gNB/eNB, i.e., with in Coverage = 1 and with SLSS ID = {1, . . . , 335}) | UE directly synchronized to GNSS (SyncRef UE directly synchronized to GNSS, i.e., with in Coverage = 1 and SLSS ID = {0}) |
| P5 | UE indirectly synchronized to gNB/eNB (SyncRef UE out of GNSS/network coverage and one hop away from a gNB/eNB, i.e., with in Coverage = 0 and with SLSS ID = {1, . . . , 335}) | UE indirectly synchronized to GNSS (SyncRef UE out of GNSS/network coverage and one hop away from GNSS, i.e., with in Coverage = 0 and SLSS ID = {0}) |
| P6 | the remaining UEs have the lowest priority (SyncRef UE out of GNSS/network coverage and two or more hops away from a gNB/eNB or GNSS, i.e., with in Coverage = 0 and with SLSS ID = {336,337, . . . , 671}; UE's own internal clock) | |

As captured for example in Table 1, a UE can select gNB/eNB or GNSS with highest priority (Priority level 0). When UE selects GNSS as the SyncRef source, the DFN, the subframe number within a frame and slot number within a frame used for NR SL communication can be derived from the current coordinated universal time (UTC) provided by the GNSS. The system frame number (SFN) that provides an indexing of the frames based on the cell timing reference can be used to derive the DFN if UE selects gNB/eNB as the SyncRef source.

When there is no gNB/eNB or GNSS available as SyncRef source, a UE can perform a full search to detect a candidate SLSS to look for SyncRef UEs. A full search can refer to a search covering all subframes and all possible SLSSIDs. By detecting the SLSS sent by a SyncRef UE, a UE may be able to synchronize to the SyncRef UE and estimate the beginning of the frame and carrier frequency. Upon successful SLSS detection, a UE can proceed with decoding the physical sidelink broadcast channel (PSBCH). If the UE has not selected a SyncRef UE as the source and multiple candidate SyncRef UEs (or SLSSIDs) are detected for which the PSBCH reference signal received power (PSBCH-RSRP) exceeds the minimum requirement by sl-SyncRefMinHyst and the corresponding MIB-SL is successfully received, the UE can choose the SyncRef UE with the highest PSBCH-RSRP as the source, considering the priority levels given in Table 1. If the UE already has selected a SyncRef UE as the source, the UE still can perform reselection of SyncRef UE if any of the following hold: the PSBCH-RSRP of the strongest candidate SyncRef UE exceeds the minimum requirement by sl-SyncRefMinHyst and the strongest candidate SyncRef UE belongs to the same priority group as the current SyncRef UE and the PSBCH-RSRP of the strongest candidate SyncRef UE exceeds the PSBCH-RSRP of the current SyncRef UE by syncRefDiffHyst; the PSBCH-RSRP of the candidate SyncRef UE exceeds the minimum requirement by sl-SyncRefMinHyst and the candidate SyncRef UE belongs to a higher priority group than the current SyncRef UE; or the PSBCH-RSRP of the current SyncRef UE is less than the minimum requirement.

When a UE selects a SyncRef UE as the source, the UE can make use of SL sync information carried in S-SSB transmitted by the SyncRef UE for synchronization.

There may be a group of SL DRX UEs in a deployment scenario where there is no gNB/eNB or GNSS available as SyncRef source to the member UEs. Such environments may include, for example, tunnel, underground, parking lot, indoor, or dense forest environments. To enable SL group communication, member UEs within the group may need the same timing reference. Also, the member UEs may need to be in sync with the neighboring UEs (non-group members) to avoid interference due to DFN misalignment.

In one approach, when gNB/eNB or GNSS are not available as a SyncRef source, each UE can select a SyncRef UE as the SyncRef source among candidate SyncRef UEs that are transmitting SL sync information (SLSS, PSBCH) in S-SSB with a fixed periodicity of 160 ms (for example, 16 radio frames) to have the same timing reference. However, selection or re-selection of SyncRef at the UE using this approach may involve a full SyncRef search (sync search for short). This full sync search may cover all subframes and all possible SLSSIDs. The full sync search may be used to detect S-SSB (or candidate SLSS) transmitted at every 160 ms by SyncRef UEs. Each group member SL DRX UE can independently perform selection or re-selection of a SyncRef UE with a full sync search to have the same timing reference as illustrated in FIG. 1. This may be power consuming and particularly expensive (in terms of power) for power constrained SL DRX UEs since they may not get a chance to switch-off the RF completely or fall into deep sleep mode. This lack of chance for deep sleep may significantly reduce the power saving gain from SL DRX. Even when the SyncRef UE is selected, the member UE may still need to perform sync search to identify candidate SyncRef UEs which may potentially be more suitable (for example, stronger PSBCH-RSRP or higher priority) to be a synchronization reference source.

FIG. 1 illustrates a full sidelink synchronization reference search. More particularly, FIG. 1 shows a full SL sync search at member UEs of a group. SyncRef UE-1 and SyncRef UE-2 can be SyncRef UEs. A UE group's members, member UE-1, member UE-2 and member UE-3, can perform full SL sync search to detect candidate SLSS transmitted by SyncRef UEs to select their synchronization reference source.

Figure 2:
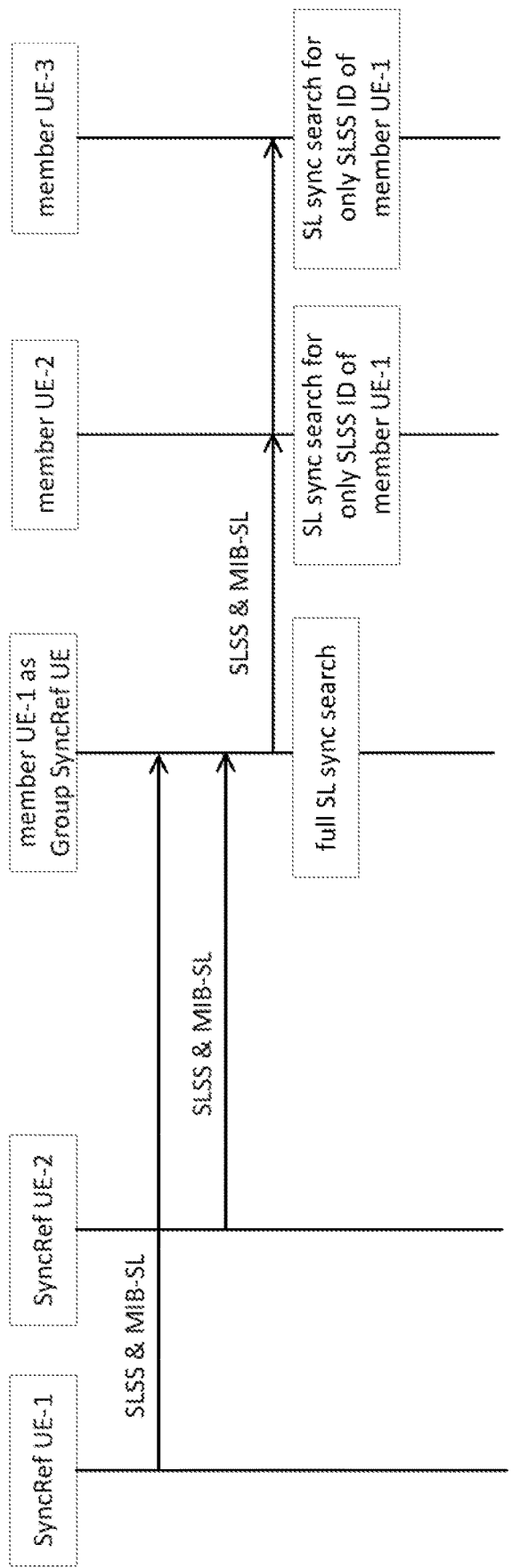
FIG. 2 illustrates a sidelink synchronization reference search for a group-specific synchronization reference.

The group may benefit from having a UE in the group to act as a group specific SyncRef, which can be referred to as a Group SyncRef UE. This Group SyncRef UE can then take the role of SyncRef to the group as well being the only UE in the group that can perform full SL sync search. The remaining group UEs can obtain their synchronization from the Group SyncRef and may not perform full sync search, allowing these UEs to save power as shown in FIG. 2. However, the approach of having a dedicated Group SyncRef UE may prevent the Group SyncRef UE (member UE-1 in FIG. 2) from achieving the same power saving gains as the remaining group UEs, since the Group SyncRef UE will have to perform full SL sync search which in turn implies that the Group SyncRef UE will be unable to enter deep sleep state as the Group SyncRef UE will be unable to switch-off the Group SyncRef UE's radio components completely. Therefore, for such a scheme for group power saving in SL synchronization to be feasible, the scheme may need to ensure a fair and/or equal power saving across all SL DRX UEs group members.

FIG. 2 illustrates a sidelink synchronization reference search for a group-specific synchronization reference. In FIG. 2, SyncRef UE-1 and SyncRef UE-2 can be SyncRef UEs. Within a UE group, member UE-1 can act as Group SyncRef UE by performing full sync search and sending group-specific S-SSB to the other member UEs, and member UE-2 and member UE-3 can perform reduced SL sync search, as distinct from a full sync search, to receive S-SSB from the Group SyncRef UE, which in this example is member UE-1. Here, reduced SL sync search comprises monitoring only a S-SSB transmitted by the Group SyncRef UE.

Certain embodiments can provide power-efficient SL synchronization within a SL DRX UE group. More particularly, certain embodiments can provide fair and/or equal power saving advantage to all member SL DRX UEs.

As mentioned above, there may be a group of SL DRX UEs in a deployment scenario where there is no gNB/eNB or GNSS available as SyncRef source to the member UEs. Such environments may include, for example, tunnel, underground, parking lot, indoor, or dense forest environments. To ensure that all SL DRX UEs group members experience fair/equal power saving gains in regards to SL sync search, certain embodiments can provide a group coordination mechanism for initiation and passing of a group-specific SyncRef UE role among the member UEs of the group. As mentioned above, the UE operating in the group-specific SyncRef UE role can be referred to as Group SyncRef UE.

The mechanism for initiation and passing of Group SyncRef UE role among member UEs of a SL DRX UE group can include a variety of features and options, as discussed in the following examples. Among the features, there may be a trigger to initiate group coordination for group synchronization reference. There may also be initiation of group coordination for group synchronization reference, which may be implicit or explicit.

There may be a passing of the Group SyncRef UE role among group members to ensure fair/equal power saving at all member SL DRX UEs. This role passing may involve using SRC ID or member ID. There may also be multiple Group SyncRef UEs for SFN in certain embodiments. There may be an explicit indication by a current Group SyncRef UE of which UE will serve as the next Group SyncRef UE. Moreover, a Group SyncRef UE can indicate termination of group coordination for group synchronization reference. This indication of termination can be in the form of an explicit announcement or the expiration of a validity timer.

In certain embodiments, a member UE can determine whether or not to initiate group coordination to have a Group SyncRef UE based on, for example, potential power saving gain in having a Group SyncRef UE to obtain a SyncRef. If the power consumption in searching and acquiring a SyncRef from other SyncRef sources is potentially larger than that of from the Group SyncRef UE, the member UE can proceed to initiate the group coordination.

A member UE may trigger to initiate the group coordination upon entering an out-of-coverage (OoC) area (for example, tunnel, underground, parking lot, indoor, or dense forest) where there is no gNB or GNSS as the SyncRef source. As a further embodiment, the group coordination may be initiated only when the number of UE members within the group in OoC exceeds a configured threshold. Determination of whether the number exceeds a threshold may be based on the number of group coordination requests (for example, Group SyncRef request as discussed below) are observed within a configured time window. UEs may need to perform full sync search in such a scenario. If, on the other hand, a Group SyncRef UE is available, the member UEs may use the SL SyncRef from the Group SyncRef UE and therefore may not perform SyncRef UE (re) selection with full sync search to save power.

To avoid too many member UEs triggering the group coordination in a DRX cycle by sending a group coordination request (for example, a Group SyncRef request), a UE may determine not to initiate group coordination (for example, by sending the Group SyncRef request) if the UE has received at least a configured number k requests from distinct other member UEs in the DRX cycle or equivalent monitoring window. This may be particularly beneficial to reduce signaling overhead in scenarios where the whole group is an OoC area.

A member UE may trigger to initiate the group coordination when the available power (for example, a battery power) drops below a certain threshold. The use of group coordination may save power by avoiding full sync search. This member UE can be either a normal UE or a UE that has been taking previously the role of Group SyncRef UE.

To initiate group coordination, a member UE can send Group SyncRef request to other member UEs, during the common SL DRX ON duration of the group, to trigger group coordination for initiating and maintaining Group SyncRef.

An implicit request may be sent by performing SL transmission during SL DRX ON time in a resource pool that is preconfigured to indicate Group SyncRef request. Instead of simply a resource pool, there may be a configured specific resource or set of resources in the resource pool to be used to provide the implicit request. Here, a transmission resource pool (or a specific resource or set of resources in the resource pool) may be configured to be used for physical sidelink shared channel (PSSCH) transmission by those UEs who want to announce Group SyncRef request. Any transmission in this resource pool (or on a resource of a set of resources in the resource pool) by a member UE can be interpreted as the Group SyncRef request by the other member UEs.

As another alternative, an explicit request, such as a 1-bit indication, may be sent during DRX ON time in sidelink control information (SCI-1st Stage SCI or 2nd Stage SCI) or a dedicated medium access control (MAC) control element (CE).

Each group may be configured with a dedicated periodic physical sidelink feedback channel (PSFCH) resource for explicit indication in which hybrid automatic repeat request (HARQ) acknowledgement/negative acknowledgment (ACK/NACK) like sequences may be transmitted by a member UE to send Group SyncRef request. The PSFCH resource may either be mapped to the Layer 2 (L2) group ID or a member UE (for example, a UE with member ID as 0 or the group head) may periodically reserve the PSFCH resource and inform the other member UEs on the resource.

Upon receiving the Group SyncRef request from a member UE, one of the member UEs may be selected as the initial Group SyncRef UE for the current DRX cycle based on a (pre-) configured as per SRC ID/member ID, power availability and/or coverage status-based criteria such as any of the following considered alone or in combination. One criterion may be the member UE with lowest member ID, such as member ID 0. Another criterion may be the member UE with the highest or lowest SRC ID (for example, indicated in 2nd Stage SCI) among all the member UEs that have performed SL transmission in the current DRX ON period until the Group SyncRef is received. If no transmissions have taken place in the current DRX ON period, previous DRX ON period can be considered. A further criterion may be whether the UE is an in-coverage UE. An additional criterion may be power availability, such as the power type of UEs. A UE that has potentially higher power availability (such as a vehicle) may be favored to act as an initial Group SyncRef UE over a UE that has potentially lower power availability, such as a wrist-worn mobile device. An additional criterion may be internal oscillator quality, where a UE with a better oscillator (for example, with lower clock drift) may be a better SyncRef than a UE with a worse oscillator. The quality of the oscillator can also be dependent on the temperature conditions being experienced by the UE. For example, a UE that experiences strong variations on the UE's own internal temperature may experience worse variations in the UE's clock drift.

In-coverage UEs and/or UEs with no power constraints may be configured to act as initial the Group SyncRef UE based on, for example, the number of the received requests from the group members, the size of the group, or the SL DRX configuration of the group. This can be randomized with, for example, a configured persistent probability P as function of one or more of those parameters. This option could be used in addition to the above-identified criteria.

A UE member that is already acting as a SyncRef UE may be determined as an initial Group SyncRef UE. Such a UE member of the group may opt for acting as a Group SyncRef UE whether a request is received or not, because the UE is already acting as a SyncRef UE. Opting to act as the Group SyncRef for other UEs may provide power saving benefit to the group members.

In certain embodiments, the initial Group SyncRef UE(s) can announce during DRX ON duration (of the group) the SLSS ID with which the initial Group SyncRef UE(s) are transmitting the SL SyncRef. This announcement may allow the group members to find the S-SSB transmitted by the Group SyncRef UE in a S-SSB period with reduced sync search, thereby avoiding performing the full sync search and saving power.

Each group may be given a Group SLSS ID that is to be used for S-SSB by Group SyncRef UEs. In this case, the Group SyncRef UEs may not need to announce the SLSS ID, and by avoiding announcing the SLSS ID may reduce signaling overhead. Such savings may be possible when all the group member already know the SLSS ID of the S-SSB transmitted by the Group SyncRef UEs. As a result, upon receiving the Group SyncRef request announcement from any of the member UEs or the number of Group SyncRef requests received within configured time window exceeds the configured threshold, all the member UEs (including the UE that sent the request) that are not acting as the Group SyncRef UE can start searching only for the Group SLSS ID to receive the S-SSB without performing full sync search.

In certain embodiments, the initial Group SyncRef UE(s) may indicate (using, for example, a 1-bit indicator) to retain the SLSS ID in S-SSB transmissions from Group SyncRef UE(s) in subsequent DRX cycles. This indication may eliminate the need for explicit indication of SLSS ID by the Group SyncRef UEs in subsequent DRX cycles and may reduce signaling overhead.

In certain embodiments, the Initial Group SyncRef UE(s) or subsequent Group SyncRef UE(s) may indicate (using, for example, a 1-bit indicator) whether or not a reselection of Group SyncRef UE is needed in the next DRX cycle. When indicated to retain the same UE as the Group SyncRef UE for the next DRX cycle, no reselection of Group SyncRef UE may be performed by the group. This may be particularly beneficial in cases where the current Group SyncRef UE is not a power-constrained UE, such as a vehicle.

In certain embodiments, SRC ID or member ID-based reassignment of Group SyncRef UE role among member UEs may be performed at each DRX cycle (or at a configurable number of DRX cycles) to ensure fair/equal power saving at all member SL DRX UEs. The role of Group SyncRef UE may be passed from one member UE to the other member UE at every DRX cycle (or at a configurable number of DRX cycles), wherein the selection of Group SyncRef for the DRX cycle may be based on SRC ID or member ID.

In certain embodiments, among all the member UEs that have performed transmissions in the DRX ON time of a previous DRX cycle, the pre-defined rules (for example, the UE with highest or lowest SRC ID) can be used by the UEs to determine whether to take the role of Group SyncRef UE. The pre-defined rules may also define the UE to rotate for the role of Group SyncRef UE. For example, in case the UE with highest (or lowest) SRC ID is same as the UE that took the role of Group SyncRef UE (i.e. the UE with highest (or lowest) SRC ID in the DRX cycle before the previous DRX cycle), the UE with the SyncRef UE highest (or lowest) SRC ID can be exempted from taking the role of Group SyncRef UE, i.e. the UE with second highest (or lowest) SRC ID in previous DRX cycle will take the role of Group SyncRef UE.

In certain embodiments, among all the member UEs that have performed transmissions in the DRX ON time of a previous DRX cycle, UEs that have been chosen as the Group SyncRef UE a least number of times can be identified. Among the identified member UEs, a further criterion can applied such as that the UE with highest or lowest SRC ID can assume the role of Group SyncRef UE.

In certain embodiments, member ID may be used at a UE to determine whether or not to assume the role of Group SyncRef UE. Member UEs of the group may be provided with configuration or pre-configuration that maps the DRX cycle and member ID. By mapping the member ID, the UE can identify the DRX cycle in which the UE can assume the role of Group SyncRef UE. For example, the UE may use a modulo operation from the DRX cycle in which the group coordination was initiated. The configuration may be provided by the group head (for example, platoon leader) or by the gNB.

In certain embodiments, when the SLSS ID for the Group SyncRef is known, at least two Group SyncRef UEs may be selected as the Group SyncRef UEs to provide SyncRef to the group members in an SFN manner for improved robustness of Group SyncRef. By running any of the above-identified embodiments iteratively, multiple Group SyncRef UEs for the DRX cycle can be identified. The number of Group SyncRef UEs to be determined may be configured or pre-configured and hence may be known by all the member UEs.

In certain embodiments, when multiple Group SyncRef UEs are configured to provide Group SyncRef in an SFN manner, the number of S-SSB transmissions within one sidelink S-SSB period can be reduced (for example, the number of transmission can be reduced to 2, 4, or 16 times) from legacy values (for example 4, 16, 32, and 64 times as defined in sl-NumSSB-WithinPeriod of SL-SyncConfig) for higher SCS since the SFN may provide a robust SyncRef transmission.

In certain embodiments, a UE may determine whether or not to assume the role of Group SyncRef UE in a DRX cycle based on an explicit indication from the Group SyncRef UE of the previous DRX cycle. A Group SyncRef UE of a DRX cycle may select the Group SyncRef UE explicitly for the next DRX cycle.

In certain embodiments, the member UE that had initiated the group coordination for Group SyncRef by announcing Group SyncRef request may terminate the group coordination by announcing Group SyncRef stop to other member UEs during SL DRX ON time.

For example, an explicit termination indication (1-bit indication) may be sent during DRX ON time in SCI (1st Stage SCI or 2nd Stage SCI). As another option, each group may be configured with a dedicated periodic PSFCH resource for explicit termination indication in which HARQ NACK/ACK like sequence may be transmitted by a member UE to send Group SyncRef stop. Here, PSFCH resource may either be mapped to the Layer 2 (L2) group ID or a member UE (e.g., UE with member ID as 0 or the group head) may periodically reserve the PSFCH resource and inform the other member UEs on the resource.

As a further option, a validity timer may be in included in Group SyncRef request, which may indicate termination time for the group coordination. Each group coordination may also be configured with a default validity timer.

Group SyncRef UE may indicate in the Group SyncRef UE's synchronization information (for example, in PSBCH) that the source of SL synchronization is a Group SyncRef UE.

In one implementation, other UEs (non-member UEs) may exclude Group SyncRef UE, by not considering the Group SyncRef UE to be a candidate SyncRef UE, in their SyncRef (re-) selection when the PSBCH-RSRP is weaker, for example below a certain predetermined threshold. The Group SyncRef UE role may be passed frequently among the member UEs of the group and hence the non-member UE may have a varying PSBCH-RSRP measurement for the respective SyncRef signal, such as S-SSB. This may trigger SyncRef re-selection frequently at other UEs. Also, Group SyncRef UE may not follow release 16 (Rel. 16) criteria to be a SyncRef UE based on PSBCH-RSRP.

In another implementation, other UEs (non-member UEs) may consider the Group SyncRef UE in their SyncRef (re-) selection with higher priority when the PSBCH-RSRP is significantly higher, for example above a certain predetermined threshold, which does not have to be the same as threshold for exclusion although it can be the same threshold. This prioritization can avoid any potential sync misalignment between the group member UEs and neighboring UEs which may cause interference to each other's SL transmissions.

As mentioned above, there may be a group of SL DRX UEs in a deployment scenario where there is no gNB/eNB or GNSS available as SyncRef source to the member UEs. Such environments may include, for example, tunnel, underground, parking lot, indoor, or dense forest environments. To provide power efficient SL synchronization at the group (or to reduce average power consumption at the group in SL sync search), at a given S-SSB period, a member SL DRX UE can act as a Group SyncRef UE that can perform a full SL sync search, while the other member SL DRX UEs may use the SL SyncRef from the Group SyncRef UE and therefore may not need to perform full SL sync search to save power, as shown in FIG. 2 and discussed above.

While the other group member UEs may reap the benefit (in terms of power saving) of having a Group SyncRef UE, the UE that is acting as a Group SyncRef UE may potentially continue to have no chance to switch-off the Group SyncRef UE's radio components completely due to full sync search (like legacy DRX UEs) and therefore may not have the power saving advantage of other member UEs.

Therefore, to ensure a fair/equal power saving advantage across all member SL DRX UEs, certain embodiments provide a group coordination mechanism to initiate and rotate Group SyncRef UE role among the member UEs. This may enable different member UEs to become a Group SyncRef UE in different DRX cycle (in DRX ON duration) in a consistent manner (i.e., consistent interpretation of Group SyncRef UE role initiation and passing across all member UEs).

Figure 3:
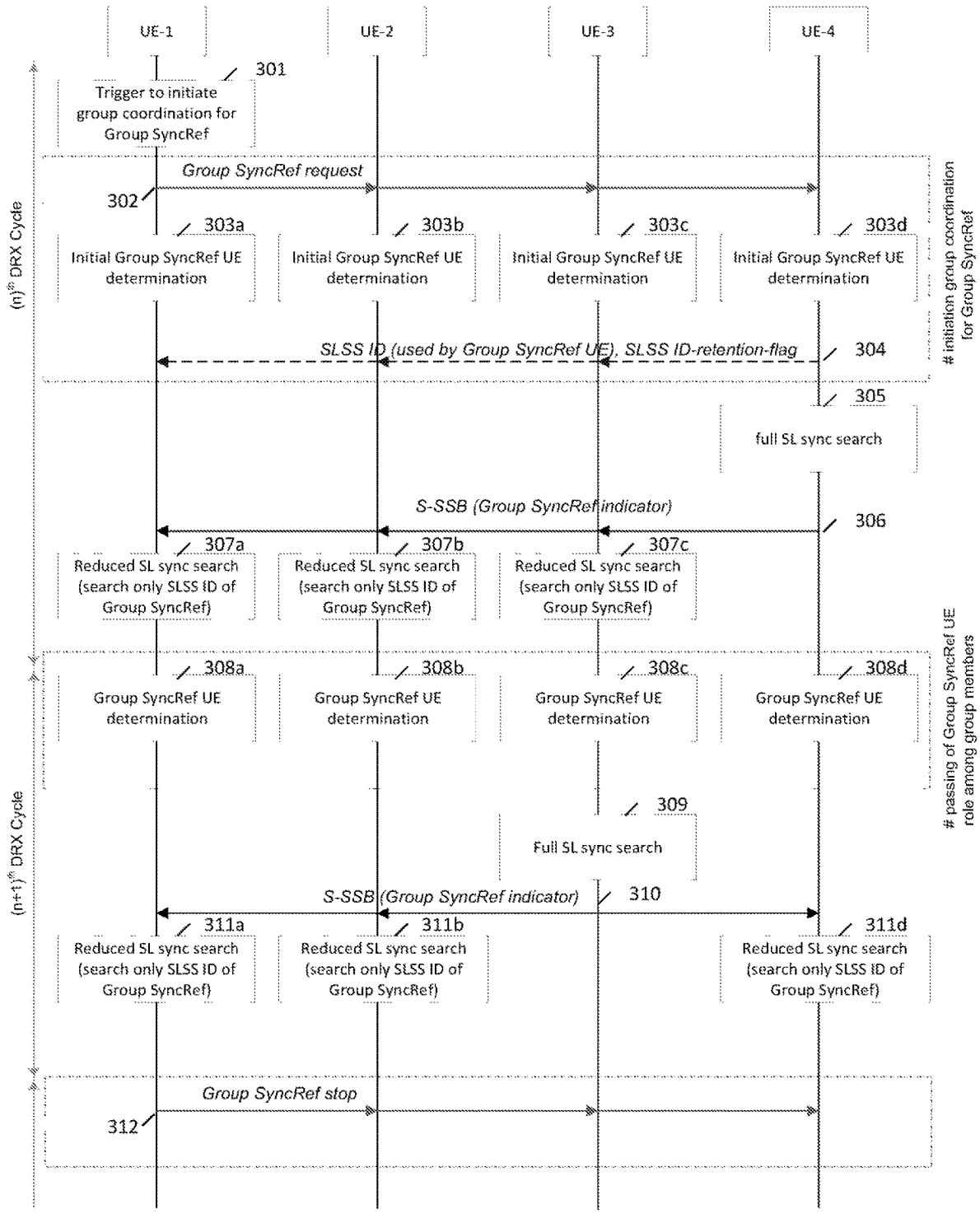
FIG. 3 illustrates an example implementation of a procedure, according to certain embodiments.

FIG. 3 illustrates an example implementation of a procedure, according to certain embodiments. FIG. 3 illustrates an example implementation of a procedure for a SL group of four SL DRX UEs UE-1, . . . , UE-4 with distinct SRC IDs 1 to 4, respectively. SRC IDs 1 to 4 are used for convenience of illustration/description and not by way of limitation. The description of each procedure shown in FIG. 3 is as follows.

At 301, upon entering an OoC area, UE-1 can determine to initiate the group coordination to have a Group SyncRef UE considering the potential power saving gain in having a Group SyncRef UE to obtain a SyncRef with a reduced sync search instead of full sync search.

At 302, UE-1 may groupcast Group SyncRef request announcement in SCI (here, 1-bit indication in 1st Stage SCI or 2nd Stage SCI is assumed) to other member UEs during SL DRX ON time of the group to trigger the group coordination for initiating and maintaining Group SyncRef.

At 303a, 303b, 303c, and 303d, each UE can determine whether or not they meet the criteria to be the initial Group SyncRef UE (based on SRC ID or member ID). In this example, member UE with the highest SRC ID (indicated in 2nd Stage SCI) among all the member UEs that have performed SL transmission in the current DRX ON period until the Group SyncRef is received can be considered as the criterion. Assuming that all member UEs have performed transmission in the current DRX cycle (i.e. nth DRX cycle in the illustration), only UE-4 (UE with the highest SRC ID) meets the criterion and hence only UE-4 decides to assume the role of Group SyncRef UE.

Upon determining to be the initial Group SyncRef UE at 303d, at 304, UE-4 may indicate in, e.g., 2nd Stage SCI the SLSS ID of S-SSB transmitted by the Group SyncRef UE. Also, an SLSS ID-retention-flag which is set to True can be included in the SCI to indicate that the subsequent Group SyncRef UE will be using the same SLSS ID for the Group SyncRef transmission.

At 305, UE-4, acting as Group SyncRef UE, can perform full SL sync search and synchronizes with a suitable SyncRef (as per legacy behavior defined in TS 38.331 Section 5.8.6.2).

At 306, UE-4 can transmit S-SSB to provide Group SyncRef to the other members UEs. In MIB-SL (i.e. PSBCH message), the UE can include the optional Group SyncRef Indicator (1-bit) to indicate that the source of the SyncRef is Group SyncRef UE. This allows other UEs (non-member UEs) to, for example, exclude Group SyncRef UE (not consider as a candidate SyncRef UE) in their SyncRef (re-) selection.

At 307a, 307b, and 307c, UE-1 (or the other member UEs: UE-1 to UE-3 as illustrated) can perform reduced sync search (instead of full sync search) to obtain SyncRef (i.e., Group SyncRef) by monitoring only the SLSS ID indicated at 304, and hence save power.

At 308a, 308b, 308c, and 308d, at the beginning of a DRX cycle (or at a fixed number of DRX cycles), for example every (n+1) th DRX cycle, each member UE can determine whether or not they meet the SRC ID/member ID-based criteria to be the Group SyncRef UE for the DRX ON duration of the DRX cycle. Here, SRC ID/member ID-based Group SyncRef UE determination criteria enables the passing of Group SyncRef UE role among member UEs from one DRX cycle to the other to have a fair/equal power saving advantage at all member UEs.

FIG. 4 illustrates an example of group synchronization reference user equipment determination, according to certain embodiments. More particularly, FIG. 4 illustrates the Group SyncRef UE determination at (n+1) th DRX cycle with the following example determination criterion: among all the member UEs that have performed transmissions in the DRX ON time of a previous DRX cycle, UEs that have been determined to be the Group SyncRef UE a least number of times can be identified. Among the identified member UEs, the UE with highest (or lowest) SRC ID can assume the role of Group SyncRef UE. To support this, in this example implementation, each member UE can maintain a table, as illustrated in Table 2 below, where the member UE can note the number of times each member UE has assumed the role of Group SyncRef UE from the initiation of group coordination (i.e. nth DRX cycle) and can update the table at every DRX cycle. X1 can be the number of times the UE-1 has been determined as the role of Group SyncRef UE.

TABLE 2

Numbers of times a member UE has assumed the role of Group SyncRef UE

| UE SRC ID (SRC_ID) | No. of times the UE acted as Group SyncRef UE (X) |
|---|---|
| 1 | $X_1$ |
| 2 | $X_2$ |
| 3 | $X_3$ |
| 4 | $X_4$ |

As shown in FIG. 4, at 410, the UE can construct a set $S_{trans}$ with SRC IDs of all the UEs that have performed SL transmission during DRX ON time of $(n+1-1)^{th}$ DRX cycle. At 420, the UE can construct a set $S_{count}$ (subset of $S_{trans}$) with those SRC IDs in $S_{trans}$ which have been determined to have been Group SyncRef UEs least no. of times until $(n+1-1)^{th}$ DRX cycle (cf. Table 2). At 430, the UE with the largest SRC_ID in $S_{count}$ is can be determined as the Group SyncRef UEs for $(n+1)^{th}$ DRX cycle.

In the example of FIG. 3, UE-3 can be assumed to have been determined as the Group SyncRef UE following the determination procedure illustrated in FIG. 4.

Thus, similar to what was done at 307, acting as Group SyncRef UE, at 309, UE-3 can perform full SL sync search and synchronizes with a suitable SyncRef (as per legacy behaviour defined in TS 38.331 Section 5.8.6.2).

Similar to what was done at 306, at 310, UE-3 can transmit S-SSB to provide Group SyncRef to the other members UEs. Since SLSS ID-retention-flag which is set to True in the message sent at 304, UE-3 makes use of the same SLSS ID announced by the initiating Group Reference UE for S-SSB transmission.

Similar to what occurred at 307a, 307b, and 307c, at 311a, 311b, and 311d, UE-1 (or the other member UEs: UE-1, UE-2 and UE-4 as illustrated) can perform reduced sync search (instead of full sync search) to obtain SyncRef (i.e., Group SyncRef) by monitoring only the SLSS ID indicated by the message at 304, and hence saves power.

At 312, UE-1 (which had initiated the group coordination at 302), upon re-entering the coverage area, can terminate the group coordination by announcing Group SyncRef stop to other member UEs during SL DRX ON time.

Figure 5:
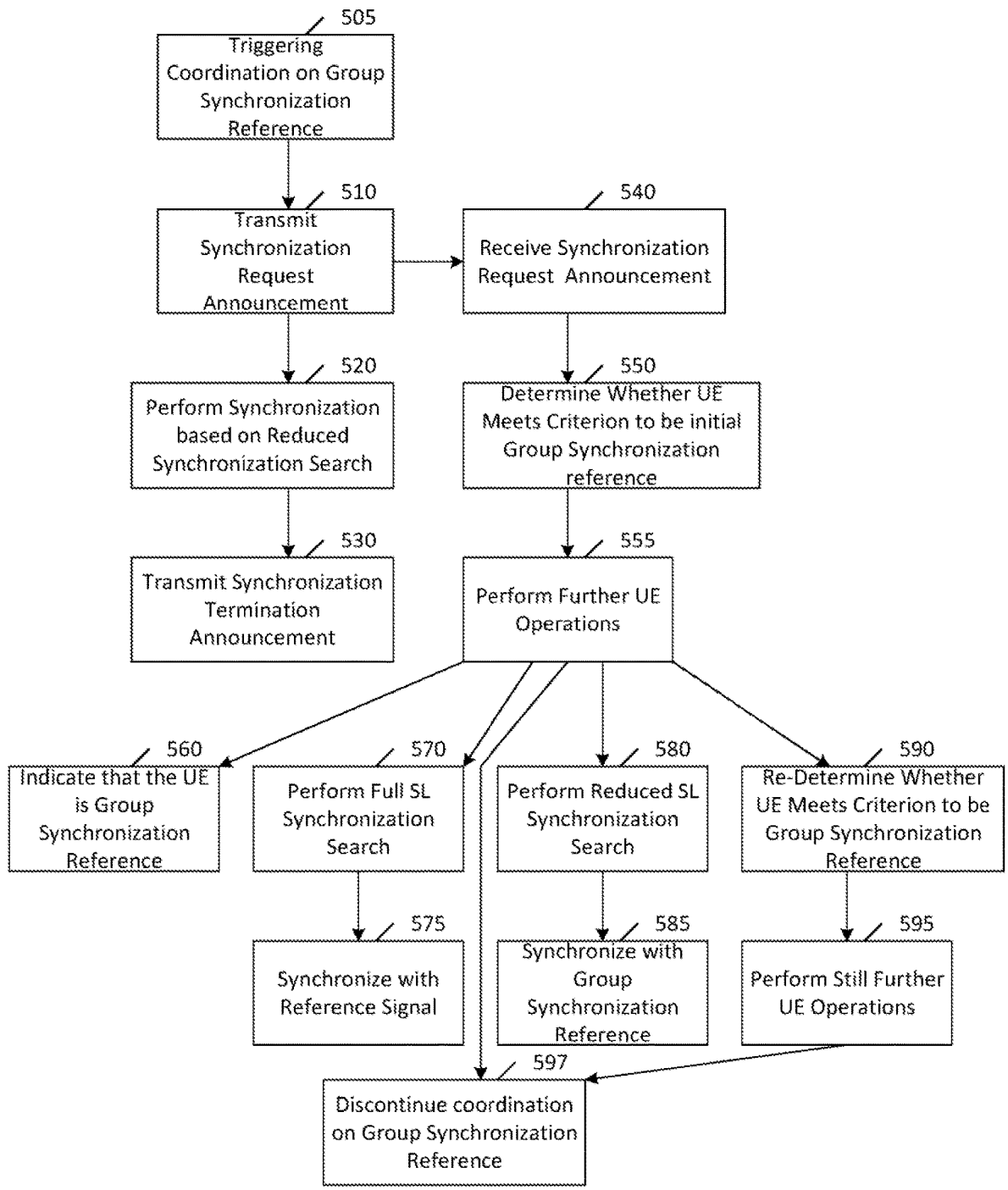
FIG. 5 illustrates an example flow diagram of a method, according to an embodiment.

FIG. 5 illustrates an example flow diagram of a method for providing sidelink group coordination for group-specific synchronization reference, according to certain embodiments.

The method can include, at 510, transmitting (for example, by groupcasting or another way) a synchronization request announcement from a user equipment to at least one other user equipment of the group while the user equipment is in an out of coverage area of a serving network. The synchronization request can be configured to permit determination of a group synchronization reference user equipment.

The method can further include, at 505, triggering the coordination on group synchronization reference based on a determination that the group synchronization reference user equipment is beneficial for power saving for example in the out of coverage area.

The method can additionally include, at 520, performing synchronization based on the reduced synchronization search. The method can also include, at 530, transmitting a synchronization termination announcement to at least one other user equipment of the group to discontinuing coordination on group synchronization reference upon for example the user equipment exiting the out of coverage area.

The method can also include, at 540, receiving a synchronization request announcement at a user equipment from another user equipment of the group. This may be the same synchronization request announcement sent at 510. The method can further include, at 550, determining whether the user equipment meets at least one criterion to be an initial group synchronization reference. The at least one criterion can be a number of times the user equipment has been group synchronization reference, a source identifier, a member identifier, power availability, or coverage status.

The method can additionally include, at 555, performing further user equipment operations based on the determination.

When the determination is that the user equipment meets the at least one criterion, the further operations can include, at 560, indicating to the another user equipment of the group that the user equipment will act as group synchronization reference.

When the determination is that the user equipment meets the at least one criterion, the further operations can include, at 570, performing a full sidelink synchronization search and, at 575, synchronizing with a suitable synchronization reference.

When the determination is that the user equipment does not meet the at least one criterion, the further operations can include, at 580, performing a reduced sidelink synchronization search and, at 585, synchronizing based on the reduced sidelink synchronization search. The reduced sidelink synchronization search can include monitoring only a sidelink synchronization signal identified by a group synchronization reference user equipment.

The method can further include, at 590, after a predetermined number of sidelink discontinuous reception cycles from the determining whether the user equipment meets the at least one criterion, determining whether the user equipment meets the at least one criterion, as an updated determination. The method can also include, at 595, performing still further user equipment operations based on the updated determination.

The method can further include, at 597, discontinuing coordination on group synchronization upon, for example, receiving the group synchronization termination announcement.

It is noted that FIG. 5 is provided as one example embodiment of a method or process. However, certain embodiments are not limited to this example, and further examples are possible as discussed elsewhere herein.

Figure 6:
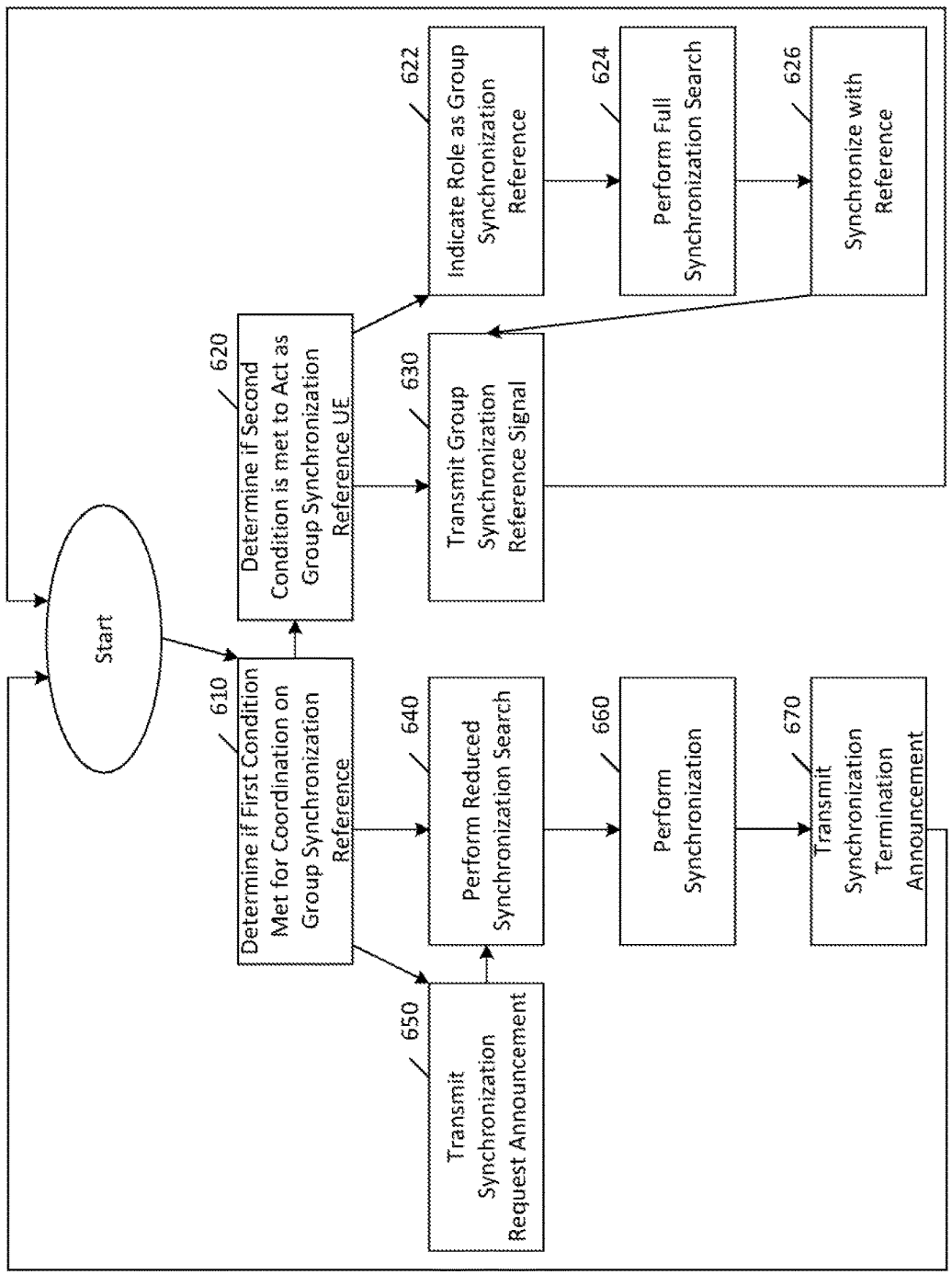
FIG. 6 illustrates an example flow diagram of a method for providing sidelink group coordination for group-specific synchronization reference, according to certain embodiments.

FIG. 6 illustrates an example flow diagram of a method for providing sidelink group coordination for group-specific synchronization reference, according to certain embodiments.

The method can include, at 610, determining, by a user equipment, whether a first condition is met for coordination on group synchronization reference for a group of user equipment. The first condition can be met when the user equipment is in an out of coverage area of a serving network or the user equipment requires power saving or the user equipment receives the synchronization request announcement from another user equipment, for example at least one other user equipment of the group.

The method can also include, at 620, determining, by the user equipment, whether a second condition is met to act as group synchronization reference user equipment for the group.

The method can further include, at 630, transmitting, by the user equipment, a group synchronization reference signal when determined to act as the group synchronization reference user equipment.

The method can additionally include, at 640, performing, by the user equipment, a reduced synchronization search when determined not to act as the group synchronization reference user equipment. The reduced synchronization search can be performed using a synchronization reference from a group synchronization reference user equipment. The reduced sidelink synchronization search can include monitoring only a sidelink synchronization signal transmitted by a group synchronization reference user equipment.

The method can also include, at 650, transmitting, by the user equipment, a synchronization request announcement from a user equipment to at least one other user equipment (for example, to a group of user equipment) when the first condition is met. The synchronization request may be configured to permit the determination of whether the second condition is met. The announcement can be sent via at least one of a physical sidelink control channel, a physical sidelink shared channel, or a physical sidelink feedback channel.

The method can further include, at 660, performing, by the user equipment, synchronization based on the reduced synchronization search.

The method can additionally include, at 670, transmitting, by the user equipment, a synchronization termination announcement to at least one other user equipment of the group upon the first condition no longer being met. The synchronization termination announcement can be configured to discontinue the coordination of group synchronization reference. The synchronization termination announcement can be sent via at least one of a physical sidelink control channel, a physical sidelink shared channel, or a physical sidelink feedback channel.

When the second condition is met, the method can further include, at 622, indicating, by the user equipment, to at least one other user equipment of the group that the user equipment will act as group synchronization reference. The indicating can include sending at least one of a sidelink synchronization signal identifier, coverage indicator, or a sidelink synchronization signal identifier retention flag. Moreover, the indicating can include indicating whether reselection of group synchronization reference user equipment is needed at a next discontinuous reception cycle. Additionally, the indicating can include sending an indication via a first stage sidelink control information in a physical sidelink control channel or a second stage sidelink control information in a physical sidelink shared channel.

When the second condition is met, the method can further include, at 624, performing, by the user equipment, a full sidelink synchronization search. The method can additionally include, at 626, synchronizing, by the user equipment, with a suitable synchronization reference. For example, the suitable reference may be any of the above-described potential sources to be used by a group synchronization reference.

After a predetermined number of sidelink discontinuous reception cycles from the determining whether the second condition is met, the method can return to determining, by the user equipment, whether the second condition is met, as an updated determination and performing, by the user equipment based on the updated determination, transmitting the group synchronization reference signal when determined to act as the group synchronization reference user equipment and performing the reduced synchronization search when determined not to act as the group synchronization reference user equipment.

The determining whether the second condition is met can be based on at least one criterion. The at least one criterion can include at least one of a number of times the user equipment has been group synchronization reference, a source identifier, a member identifier, power availability, or coverage status.

It is noted that FIG. 6 is provided as one example embodiment of a method or process. However, certain embodiments are not limited to this example, and further examples are possible as discussed elsewhere herein.

Figure 7A:
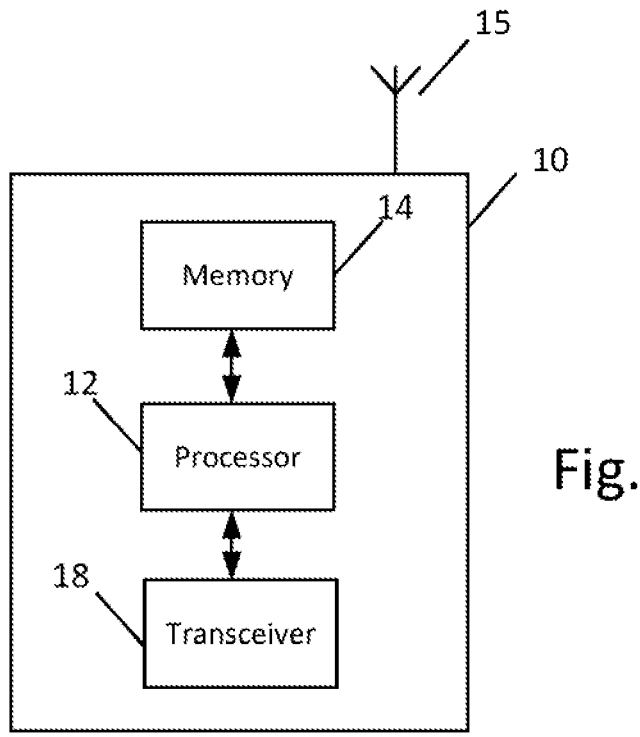
FIG. 7A illustrates an example block diagram of an apparatus, according to an embodiment.

FIG. 7A illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7A.

As illustrated in the example of FIG. 7A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 7A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultra-wideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-5, or any other method described herein. In some embodiments, as discussed herein, apparatus 10 may be configured to perform a procedure relating to providing sidelink group coordination for group-specific synchronization reference, for example.

Figure 7B:
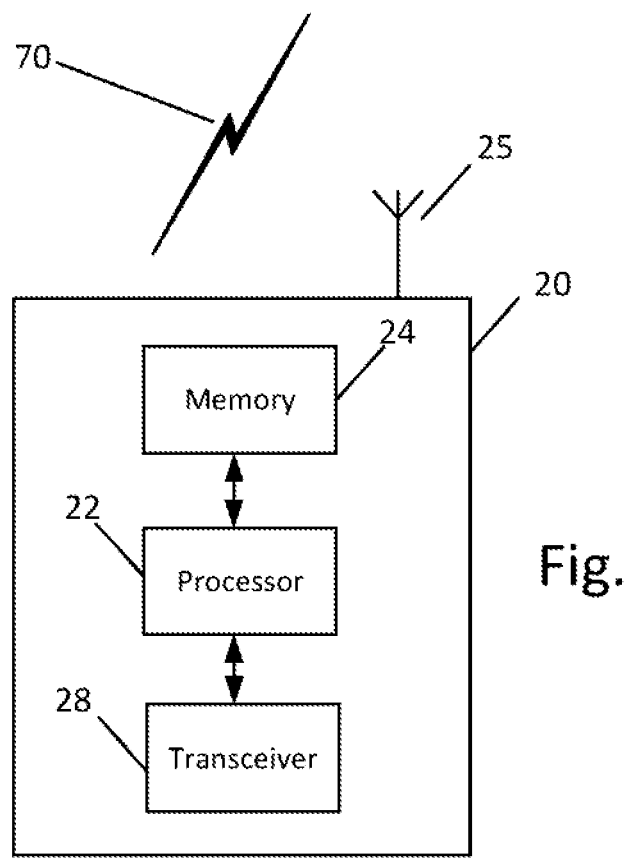
FIG. 7B illustrates an example block diagram of an apparatus, according to an embodiment.

FIG. 7B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7B.

As illustrated in the example of FIG. 7B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-5, or any other method described herein. For example, in an embodiment, apparatus 20 may be controlled to perform a process relating to providing sidelink group coordination for group-specific synchronization reference, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, the mechanism of certain embodiments may permit passing of Group SyncRef UE role among member UEs by providing a consistent interpretation of Group SyncRef UE determination at every DRX cycle (or at fixed number of DRX cycles) across all member UEs. This may ensure fair/equal power saving at all member SL DRX UEs in supporting power efficient SL sync search at a SL DRX UE group. Hence, the SL DRX UE group can reap the benefit of having a group-specific SyncRef UE for reduced SL sync search to save power, without putting any member UE at disadvantage in terms of power consumption. Making the same member UE always perform potentially power-hungry full SL sync search may be considered putting that UE at a disadvantage in terms of power consumption. This balancing mechanism may be particularly beneficial for the power-constrained devices such as VRUs and for UEs in public safety and commercial use cases where the power saving is a critical requirement.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

3GPP 3rd Generation Partnership Project
ACK Acknowledgment
DFN Direct Frame Number
DRX Discontinuous Reception
eNB eNodeB
gNB gNodeB
GNSS Global Navigation Satellite System
HARQ Hybrid Automatic Repeat Request
ID Identifier
IR Invention Report
L2 Layer 2
MIB-SL Master Information Block Sidelink
NACK Negative Acknowledgment
NR New Radio
OOC Out-of-Coverage
PSBCH Physical Sidelink Broadcast Channel
PSSCH Physical Sidelink Shared Channel
RSRP Reference Signal Received Power
SCI Sidelink Control Information
SCS Subcarrier Spacing
SL Sidelink
SLSS Sidelink Synchronization Signal
S-PSS Sidelink Primary Synchronization Signal
SRC Source
S-SSB Sidelink Synchronization Signal Block
S-SSS Sidelink Secondary Synchronization Signal
Sync synchronization
SyncRef synchronization reference
UE User Equipment

We claim:

1. An apparatus, comprising:
at least one processor; and
at least one memory including computer program instructions,
wherein the at least one memory and the computer program instructions are configured to, with the at least one processor, cause the apparatus at least to perform:
determining whether a first condition is met for coordination on group synchronization reference for a group of user equipment;
determining whether a second condition is met to act as group synchronization reference user equipment for the group;
transmitting a group synchronization reference signal, performing a full sidelink synchronization search and synchronizing with a suitable synchronization reference, when determined to act as the group synchronization reference user equipment; and
performing a reduced synchronization search when determined not to act as the group synchronization reference user equipment.

2. The apparatus of claim 1, wherein the at least one memory and the computer program instructions are configured to, with the at least one processor, cause the apparatus at least to perform:
transmitting a synchronization request announcement to the group when the first condition is met.

3. The apparatus of claim 2, wherein the first condition is met when the apparatus is in an out of coverage area of a serving network or the apparatus requires power saving or the apparatus receives the synchronization request announcement from at least one other user equipment of the group.

4. The apparatus of claim 2, wherein the synchronization request announcement is sent via at least one of a physical sidelink control channel, a physical sidelink shared channel, or a physical sidelink feedback channel.

5. The apparatus of claim 1, wherein the at least one memory and the computer program instructions are further configured to, with the at least one processor, cause the apparatus at least to perform:
performing synchronization based on the reduced synchronization search; and
transmitting a synchronization termination announcement to at least one other user equipment of the group upon the first condition no longer being met.

6. The apparatus of claim 5, wherein the synchronization termination announcement is sent via at least one of a physical sidelink control channel, a physical sidelink shared channel, or a physical sidelink feedback channel.

7. The apparatus of claim 1, wherein the reduced sidelink synchronization search comprises monitoring only a sidelink synchronization signal transmitted by a group synchronization reference user equipment.

8. The apparatus of claim 1, wherein, when the second condition is met, the at least one memory and the computer program instructions are further configured to, with the at least one processor, cause the apparatus at least to perform:
indicating to at least one other user equipment of the group that the apparatus will act as group synchronization reference.

9. The apparatus of claim 8, wherein the indicating comprises sending at least one of a sidelink synchronization signal identifier, coverage indicator, or a sidelink synchronization signal identifier retention flag.

10. The apparatus of claim 8, wherein the indicating comprises indicating whether reselection of group synchronization reference user equipment is needed at a next discontinuous reception cycle.

11. The apparatus of claim 8, wherein the indicating comprises sending an indication via a first stage sidelink control information in a physical sidelink control channel or a second stage sidelink control information in a physical sidelink shared channel.

12. The apparatus of claim 1, wherein the at least one memory and the computer program instructions are further configured to, with the at least one processor, cause the apparatus at least to perform:
after a predetermined number of sidelink discontinuous reception cycles from the determining whether the second condition is met, determining whether the second condition is met, as an updated determination; and
performing, based on the updated determination, transmitting the group synchronization reference signal when determined to act as the group synchronization reference user equipment and performing the reduced synchronization search when determined not to act as the group synchronization reference user equipment.

13. The apparatus of claim 12, wherein the determining whether the second condition is met is based on at least one criterion, the at least one criterion comprising at least one of a number of times the user equipment has been group synchronization reference, a source identifier, a member identifier, power availability, or coverage status.

14. The apparatus of claim 12, wherein the determining whether the second condition is met is based on the reception of synchronization request announcement from at least one other user equipment of the group.

15. A method, comprising:
- determining, by a user equipment, whether a first condition is met for coordination on group synchronization reference for a group of user equipment;
- determining, by the user equipment, whether a second condition is met to act as group synchronization reference user equipment for the group;
- determining, by the user equipment, to act as the group synchronization reference user equipment;
- transmitting, by the user equipment, a group synchronization reference signal, performing a full sidelink synchronization search and synchronizing with a suitable synchronization reference, when determined to act as the group synchronization reference user equipment;
- determining, by the user equipment, not to act as the group synchronization reference user equipment; and
- performing, by the user equipment, a reduced synchronization search when determined not to act as the group synchronization reference user equipment.

16. The method of claim 15, further comprising:
- transmitting, by the user equipment, a synchronization request announcement from a user equipment to the group when the first condition is met.

17. The method of claim 16, wherein the first condition is met when the user equipment is in an out of coverage area of a serving network or the user equipment requires power saving or the user equipment receives the synchronization request announcement from at least one other user equipment of the group.

18. A method, comprising:
- determining, by a user equipment, a first condition is met for coordination on group synchronization reference for a group of user equipment;
- transmitting, by the user equipment, a synchronization request announcement from the user equipment to the group, wherein the synchronization request announcement is sent via at least one of a physical sidelink control channel, a physical sidelink shared channel, or a physical sidelink feedback channel;
- determining, by the user equipment, whether a second condition is met to act as group synchronization reference user equipment for the group;
- transmitting, by the user equipment, a group synchronization reference signal, performing a full sidelink synchronization search and synchronizing with a suitable synchronization reference, when determined to act as the group synchronization reference user equipment; and
- performing, by the user equipment, a reduced synchronization search when determined not to act as the group synchronization reference user equipment.

19. The method of claim 15, further comprising:
- performing, by the user equipment, synchronization based on the reduced synchronization search; and
- transmitting, by the user equipment, a synchronization termination announcement to at least one other user equipment of the group upon the first condition no longer being met.

* * * * *